US009209887B2

(12) United States Patent
Long et al.

(10) Patent No.: US 9,209,887 B2
(45) Date of Patent: Dec. 8, 2015

(54) METHOD AND DEVICE FOR CONTROLLING RELAY TRANSMISSION BASED ON NON-REPRODUCTION RELAY MODE

(75) Inventors: Hang Long, Beijing (CN); Kan Zheng, Beijing (CN); Fangxiang Wang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 67 days.

(21) Appl. No.: 14/130,297

(22) PCT Filed: Jun. 30, 2011

(86) PCT No.: PCT/CN2011/076736
§ 371 (c)(1),
(2), (4) Date: Feb. 25, 2014

(87) PCT Pub. No.: WO2013/000171
PCT Pub. Date: Jan. 3, 2013

(65) Prior Publication Data
US 2014/0154970 A1      Jun. 5, 2014

(51) Int. Cl.
  *H04B 7/15*    (2006.01)
  *H04B 7/204*   (2006.01)
  *H04W 12/08*   (2009.01)
(52) U.S. Cl.
  CPC ............... *H04B 7/15* (2013.01); *H04B 7/204* (2013.01); *H04W 12/08* (2013.01)
(58) Field of Classification Search
  CPC ................................ H04B 7/15; H04B 7/204

USPC .......... 455/7, 67.11, 11.1, 9, 501, 67.13, 517, 455/515, 69, 24
See application file for complete search history.

(56) References Cited

U.S. PATENT DOCUMENTS

| 2011/0274026 A1* | 11/2011 | Huang et al. | 370/312 |
| 2012/0052795 A1* | 3/2012 | Shen et al. | 455/7 |
| 2013/0040557 A1* | 2/2013 | Shiizaki et al. | 455/7 |
| 2013/0279463 A1* | 10/2013 | Park et al. | 370/329 |

* cited by examiner

*Primary Examiner* — John J Lee
(74) *Attorney, Agent, or Firm* — Miles & Stockbridge P.C.

(57) ABSTRACT

The present invention discloses a method and device for controlling a relay transmission based on non-reproduction relay mode, comprising: each relay node within a service area to which a source node belongs obtaining channel status information between itself and the source node and channel status information between itself and a destination node, calculating required channel information for relay selection and feeding the required channel information back to the source node; after receiving channel information sent by the relay nodes, the source node, according to the channel information, selecting from the relay nodes a group of relay nodes with greatest feedback values in the channel information to forward information and selecting a group of relay nodes with second greatest feedback values to send interference information, selected relay nodes transmitting information to the destination node in cooperation with the source node in non-reproduction relay mode. By means of the method for controlling a relay transmission based on non-reproduction relay mode of the present invention, while greatly reducing network signaling load and computation complexity, the system secrecy capacity is ensured, the performance-to-cost ratio is high, and stronger applicability is achieved.

10 Claims, 4 Drawing Sheets

METHOD AND DEVICE FOR CONTROLLING RELAY TRANSMISSION BASED ON NON-REPRODUCTION RELAY MODE

The present invention relates to the field of wireless communication technology, and more specifically, to a method and device for controlling a relay transmission based on the non-reproduction relay mode. This application claims priority to PCT International Application No PCT/CN2011/076736 filed on Jun. 30, 2011, to the extent allowed by law.

BACKGROUND

By virtue of the broadcast property of wireless transmission media, all wireless terminals within the propagation scope might receive information from a source node. As a result, information destined to a target node from the source node might be eavesdropped by other nodes, secrecy is reduced and information cannot be transmitted securely. Thus, the secrecy of wireless communication systems becomes a focus of attention. Existing information security research mainly focuses on physical layer upper layer confidentiality agreements, i.e. ensuring information transmission security by confidentiality agreements after encapsulating physical layer transmission data.

At present researchers place emphasis on how to increase the secrecy capacity of wireless communication systems without upper layer encryption, i.e., how to make eavesdropping nodes unable to obtain or obtain as little as possible information destined from a source node to a destination node. Researchers refer to the difference between a capacity from a source node S to a destination node D and a capacity from the source node S to an eavesdropping node E as a secrecy capacity.

Meanwhile, in a traditional cellular network, if a destination node is not located at some areas where communication with a source node is impossible, such as cell edges or areas where source node signals cannot be received because of tall building obstructions, communication between the destination node and the source node is impossible, or signals therebetween are weak and the dropped-call rate increases. If, on the basis of original facilities, some relay nodes are added between the source node and the destination node or part of source nodes/destination nodes act as relay node to forward information, then the link quality between the source node and the destination node can be improved and further the system performance can be enhanced. Therefore, the research on relay technology is of great significance to new-generation wireless communication systems.

In the relay technology research, relaying may be divided into non-reproduction relaying and reproduction relaying according to different forwarded information. Non-reproduction relaying is to simply amplify received information and send it to a user, while reproduction relaying is that a relay station decodes received information and send it to a user after recoding it.

In view of advantages of relay technology, to combine physical layer information security with relaying now becomes a new research focus in the wireless field. It is found in research when a relay node approaches a destination node, the capacity from a source node to the destination node is greater than the capacity of eavesdropping links. Therefore, in cooperation relay systems with secrecy capacity restrictions, relay selection is an effective method to enhance the system performance and reduce the implementation complexity. At the same time, people find when other node assists the source node in sending interference, i.e. both the destination node and the eavesdropping node receive interference information and the destination node already learns the interference information, the secrecy capacity of systems can be enhanced effectively.

When there exist multiple relay nodes between the source node and the destination node, existing efforts to combine physical layer information security with relaying mainly concentrate on a reproduction relaying system: in the first phase, the source node broadcasts information to the multiple relay nodes, and the system selects the optimal node from successfully decoded relay nodes for forwarding and then selects an interfering node from other relay nodes for sending interference; in the second phase, the selected node is decoded and forwards information to the destination node after being recoded, and the interfering node sends interference information. The eavesdropping node can receive information sent from the relay node and the interfering node in the second phase. Nevertheless, the reproduction relay mode means high complexity to the system implementation in the respect of the system's real work.

Apparently, when ensuring the system secrecy capacity nowadays, the system complexity is high during a relay transmission in the reproduction relay mode. Therefore, there is a need for a non-reproduction relay mode based technical solution to control a relay transmission, which not only ensures the system secrecy capacity but also is easy for implementation with a simple system structure.

SUMMARY

It is a primary object of the present invention to provide a method and device for controlling a relay transmission based on non-reproduction relay mode, especially a method and device for controlling a relay transmission based on non-reproduction relay mode where there exists an eavesdropping end.

To achieve the above object, a method for controlling a relay transmission based on non-reproduction relay mode of the present invention comprises:

each relay node within a service area to which a source node belongs obtaining channel status information between itself and the source node and channel status information between itself and a destination node, calculating required channel information for relay selection and feeding the required channel information back to the source node;

after receiving channel information sent by the relay nodes, the source node, according to the channel information, selecting from the relay nodes a group of relay nodes with greatest feedback values in the channel information to forward information and selecting a group of relay nodes with second greatest feedback values to send interference information, selected relay nodes transmitting information to the destination node in cooperation with the source node in non-reproduction relay mode.

In the control method, the each relay node obtaining channel status information between itself and the source node and channel status information between itself and a destination node, calculating required channel information for relay selection and feeding the required channel information back to the source node comprises:

each node, after measuring channel coefficients between itself and the source node and between itself and the destination node, calculating absolute values of the channel coefficients between itself and the source node and between itself and the destination node, comparing the absolute values to obtain a smaller one and feeding the smaller value back to the source node.

To achieve the above object, a device for controlling a relay transmission based on non-reproduction relay mode of the present invention comprises:

an information obtaining unit for obtaining channel status information between each relay node within a service area to which a source node belongs and the source node and channel status information between the each relay node and a destination node;

a calculating unit for calculating required channel information for relay selection according to the obtained channel status information, and a relay node selecting unit for, according to the calculated channel information, selecting from the relay nodes a group of relay nodes with greatest feedback values in the channel information to forward information and selecting a group of relay nodes with second greatest feedback values to send interference information.

In the control device, the information obtaining unit obtains the channel status information by measuring channel coefficients between each relay node and the source node and between each node and the destination node;

The calculating unit calculates the required channel information for relay selection by calculating absolute values of the channel coefficients between each relay node and the source node and between each relay node and the destination node and then comparing the absolute values to obtain a smaller one.

Advantageous effects of the present invention lie in: by means of the method for controlling a relay transmission based on non-reproduction relay mode, while greatly reducing network signaling load and computation complexity, the system secrecy capacity is ensured, the performance-to-cost ratio is high, and stronger applicability is achieved.

Figure 1:
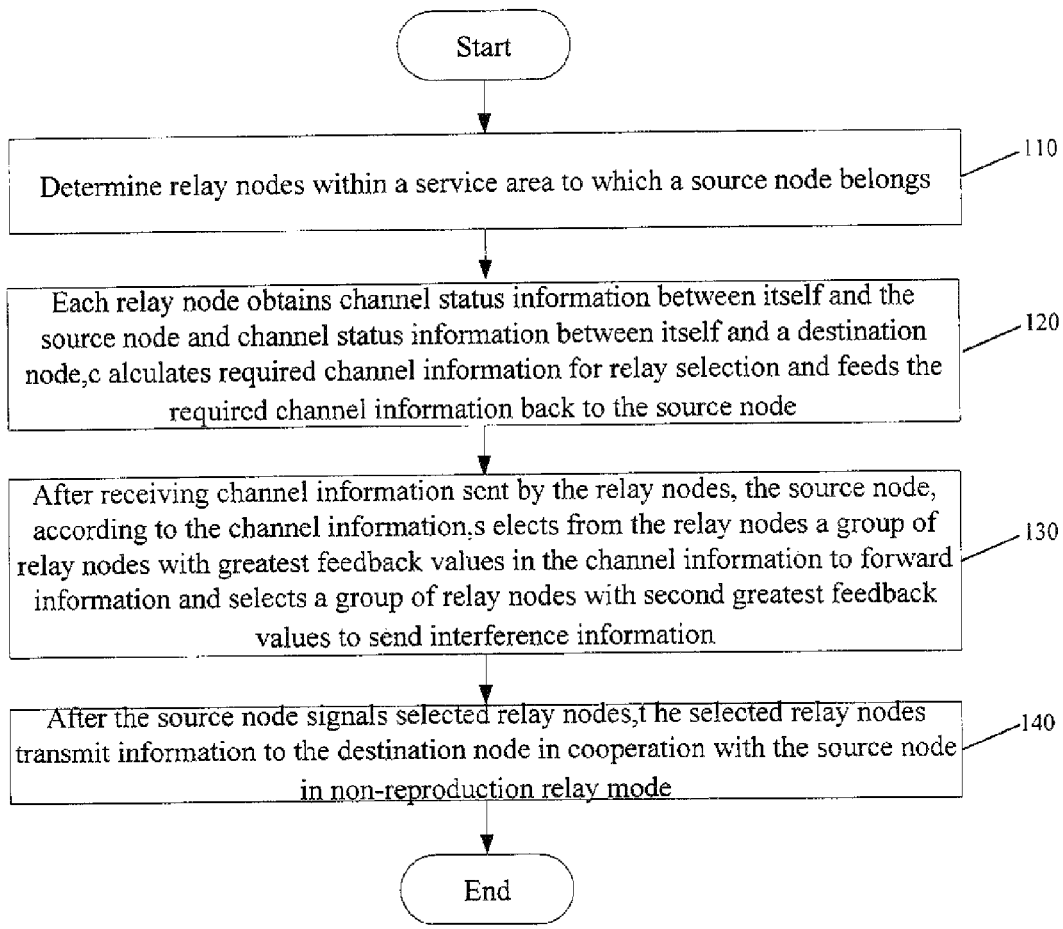
FIG. 1 is a flowchart of a method for controlling a relay transmission based on non-reproduction relay mode of the present invention.

EXPLANATIONS OF MAIN REFERENCE NUMERALS 201 relay node determining unit
202 information obtaining unit
203 calculating unit
204 relay node selecting unit

DETAILED DESCRIPTION

Further illustration is presented below to the present invention in conjunction with the accompanying drawings and concrete embodiments.

The present invention is applicable to a relay selecting and forwarding method and relay device in a single-source multi-relay system where there exists an eavesdropping end.

As shown in FIG. 1, a method for controlling a relay transmission based on non-reproduction relay mode of the present invention comprises:

In step 110, determine relay nodes within a service area to which a source node belongs.

According to network planning requirements, multiple relay stations are disposed in a cellular system. By signalling, the source node determines relay nodes within its service area, and these relay nodes act as candidate relay nodes.

In step 120, the relay nodes calculate required channel information for relay selection and feed the information to the source node according to channel status information between them and the source node and channel status information between them and a destination node.

The candidate relay nodes obtain channel coefficients between them and the source node and channel coefficients between them and the destination node, and then calculate moduli of these channel coefficients. Next, each relay node obtains a smaller value through comparison and feeds the smaller value to the source node.

Specifically, there are comprised:

In step 1201, each relay node measures channel coefficients between itself and the source node, the destination node.

In step 1202, each relay node calculates absolute values of the channel coefficients between itself and the source node, the destination node, obtains a smaller value through comparison and feeds the smaller value to the source node.

In step 130, after receiving the channel information sent from the relay nodes, the source node selects relay nodes according to the information, i.e. selecting from the candidate relay nodes a group of relay nodes with the greatest values in the channel information for forwarding information and selecting a group of relay nodes with the second greatest values for sending interference information.

In step 140, after the source nodes signals selected relay nodes, the selected relay nodes transmit information in cooperation with the source node in the non-reproduction relay mode.

Relay nodes that are not selected are kept on standby status.

Various nodes circularly execute the above steps according to a defined period. That is, the relay node periodically updates the channel status information for next relay selection. The source node sends information and utilizes the selected relay node for cooperative forwarding.

Figure 2:
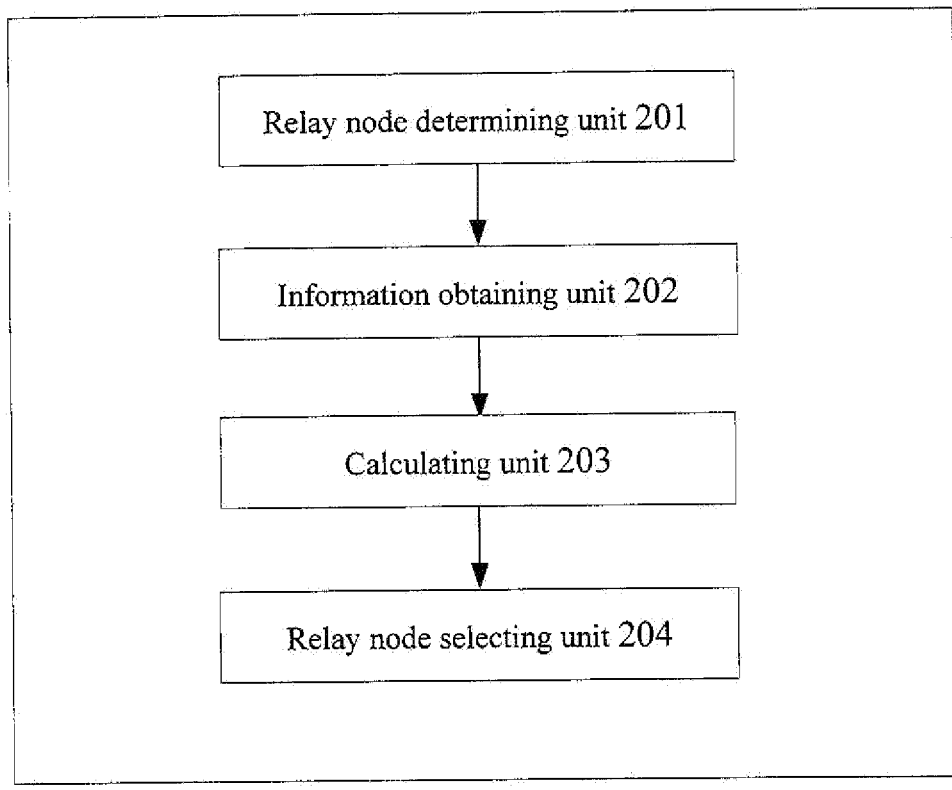
FIG. 2 is a schematic structural diagram of a device for controlling a relay transmission of the present invention.

As shown in FIG. 2, a device for controlling a relay transmission of the present invention comprises: a relay node determining unit 201, an information obtaining unit 202, a calculating unit 203 and a relay node selecting unit 204, wherein The relay node determining unit 201 is for determining relay nodes within a service area to which a source node belongs;

The information obtaining unit 202 is for obtaining channel status information between the relay nodes within the service area to which the source node belongs and the source node and channel status information between the relay nodes and a destination node.

The calculating unit 203 is for calculating required channel information for relay selection according to the obtained channel status information.

The relay node selecting unit 204 is for selecting from the relay nodes a group of relay nodes with the greatest values in the channel information for forwarding information and selecting a group of relay nodes with the second greatest values for sending interference information, according to the calculated channel information.

The relay node determining unit 201 determines the relay nodes within the service area of the source node through signaling.

The information obtaining unit 202 obtains the channel status information by measuring channel coefficients between the relay nodes and the source node and between the relay nodes and the destination node.

The calculating unit 203 calculates the required channel information relay selection by calculating absolute values of the channel coefficients between the relay nodes and the source node and between the relay nodes and the destination node and obtaining a smaller value through comparison.

The relay node selecting unit 204 is further for using selected relay nodes to transmit information in cooperation with the source node in the non-reproduction relay mode.

Further illustration is presented below to the present invention with reference to concrete embodiments.

Figure 3:
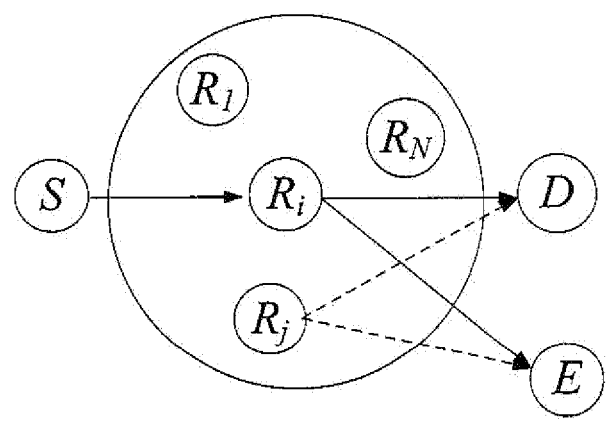
FIG. 3 is a schematic view of a single-source multi-relay wireless communication system model according to one embodiment of the present invention.

As shown in FIG. 3, suppose an environment of a single-source multi-relay wireless communication system model. The system comprises one source node (S), $M_R$ relay nodes $(R_i, \ldots, R_{M_R})$ and one destination node, wherein natural number subscripts represent serial numbers of relay nodes, there is no direct transmission link between the source node and the destination node, and information is transmitted to the destination node through multiple relay nodes. Suppose each of the source node, the relay nodes and the destination node is equipped with a single antenna, and transmitting power of the source node and the relay nodes is $P_S$ and $P_R$, respectively. $h_{SR_i}$ represents a channel between the source node and the $i^{th}$ relay node, $h_{R_iD}$ represents a channel between the $i^{th}$ relay node and the destination node, and $h_{R_iE}$ represents a channel between the $i^{th}$ relay node and an eavesdropping node. Suppose channels between the source node and the relay node and between the relay node and the destination node are quasi-static channel and keep unchanged in two-hop transmission phase. Channel noise is additive white Gaussian noise.

In the first phase, suppose information to be transmitted from S to the destination node is $x_S$, the $i^{th}$ relay node is selected to forward information, the $j^{th}$ relay node is selected to send interference information, $n_{Ri}$ is a noise value of the $i^{th}$ relay node, then received information $y_{Ri}$ of the $i^{th}$ relay node may be represented as:

$y_{R_i} = \sqrt{P_S} h_{SR_i} x_S + n_{R_i}$;

Suppose a forward coefficient of the $i^{th}$ relay node is $\beta_i$, then its forwarded information $x_{Ri}$ may be represented as $x_{R_i} = \beta_i y_{R_i}$, Where $\beta_i^{-2} = P_S |h_{SR_i}|^2 + \sigma^2$;

$\sigma^2$ is a noise power value of the $i^{th}$ relay node.

In the second phase, suppose the destination node already learns interference information sent by the $j^{th}$ relay node, then received information $y_D$ of the destination node may be represented as:

$y_D = \sqrt{P_R} h_{R_iD} x_{R_i} + n_D$;

Where $n_D$ is a noise value of the destination node.

Received information $y_E$ of the eavesdropping node may be represented as:

$y_E = \sqrt{P_R} h_{R_iE} x_{R_i} + \sqrt{P_R} h_{R_jE} x_{R_j} + n_E$;

Where $n_E$ is a noise value of the eavesdropping node; information that is forwarded by the ith relay node to the destination node and the eavesdropping node is $x_{R_i}$, interference information that is sent by the jth relay node to the destination node and the eavesdropping node is $x_{R_j}$, $h_{R_iD}$ is a channel between the ith relay node and the destination node, $h_{R_iE}$ is a channel between the ith relay node and the eavesdropping node, and $P_R$ is transmitting power of various relay nodes within a service area to which the source node belongs. Where receiving noise of the relay nodes, the destination node and the eavesdropping node follows independent identical Gaussian distribution, and respective variances are $\sigma_R^2$, $\sigma_D^2$ and $\sigma_E^2$.

Figure 4:
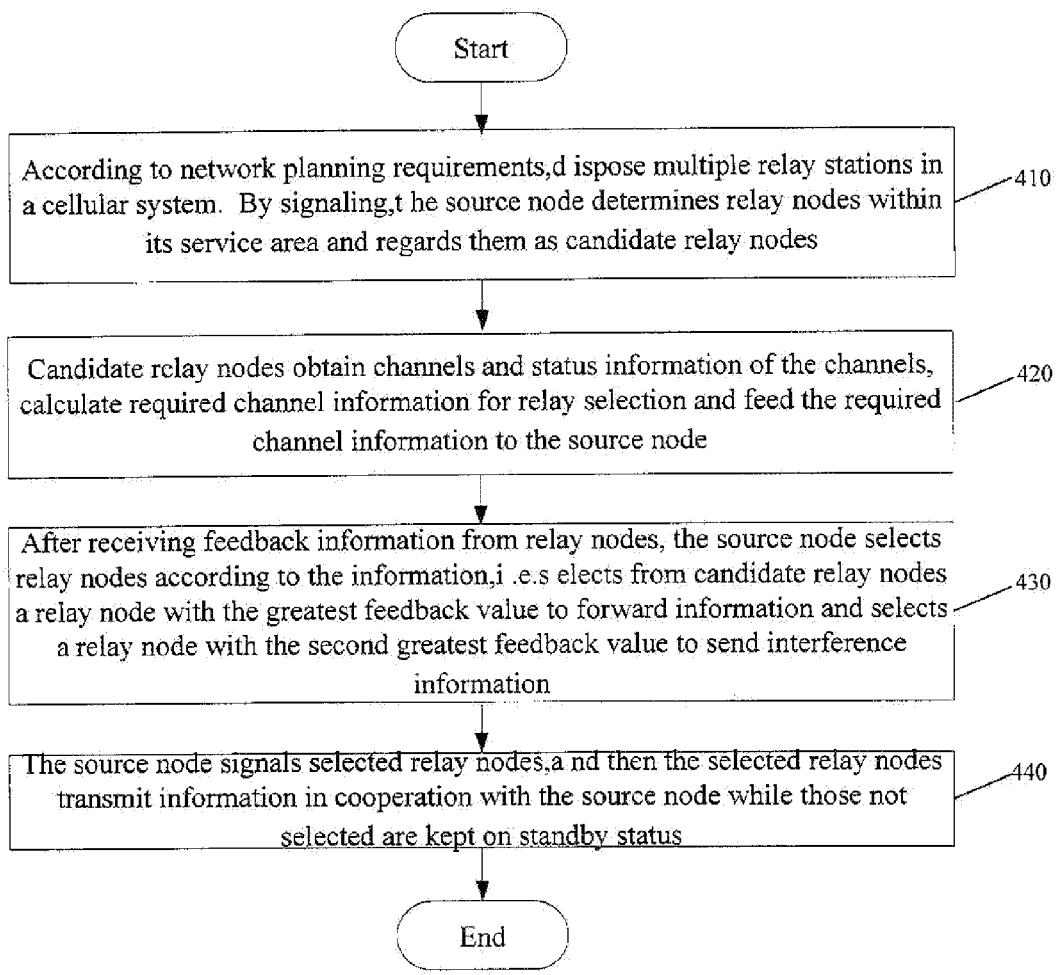
FIG. 4 is a flowchart of a relay selection method according to one embodiment of the present invention.

A relay selection method of the present invention is as shown in FIG. 4. Concrete execution steps are as below:

In step 401, dispose multiple relay stations in a cellular system according to network planning requirements. Through signaling, the source node determines relay nodes within its service area and regards them as candidate relay nodes.

In step 402, a candidate relay node $R_i$ obtains status information of S→$R_i$ channel $h_{SR_i}$ and $R_i$→D channel $h_{R_iD}$, calculates required channel information for relay selection and feeds it back to the source node. Concrete operations are as below:

In step 4021, each relay node obtains a channel coefficient $h_{SR_i}$ between itself and the source node and a channel coefficient $h_{R_iD}$ between itself and the destination node.

In step 4022, each relay node calculates modulus values of the channel coefficient $h_{SR_i}$ between itself and the source node and the channel coefficient $h_{R_iD}$ between itself and the destination node, compares the modulus values to obtain a smaller one and feeds the smaller value to the source node.

In step 403, after receiving feedback information from the relay nodes, the source node selects relay nodes according to the information, i.e. selects one with the greatest feedback value from the candidate relay nodes to forward information and selects one with the second greatest feedback value to send interference information.

In step 404, the source node signals selected relay nodes. The selected relay nodes transmit information in cooperation with the source node, while relay nodes that are not selected are kept on standby status.

The SINR (Signal-to-Interference and Noise Ratio) of the destination node is:

$$\gamma_D = \frac{\gamma_{SR_i} \cdot \gamma_{R_iD}}{\gamma_{SR_i} + \gamma_{R_iD} + 1}$$

Where $$\gamma_{SR_i} = P_S \frac{|h_{SR_i}|^2}{\sigma^2}, \gamma_{R_iD} = P_R \frac{|h_{R_iD}|^2}{\sigma^2}$$

The SINR of the eavesdropping node is:

$$\gamma_E = \frac{\gamma_{SR_i} \cdot \gamma_{R_iE}}{\gamma_{SR_i} \cdot \gamma_{R_iE} + \gamma_{R_iE} + \gamma_{SR} + \gamma_{R_iE} + 1}$$

Where $$\gamma_{SR} = P_S \frac{|h_{SR}|^2}{\sigma^2}, \gamma_{R_iE} = P_R \frac{|h_{R_iE}|^2}{\sigma^2}, \gamma_{R_jE} = P_R \frac{|h_{R_jE}|^2}{\sigma^2}$$

According to definition of the secrecy capacity, an effect function related to the secrecy capacity is built as:

$C_S = \log_2(1+\gamma_D) - \log_2(1+\gamma_E)$

Performance test and evaluation are conducted according to the communication system of the above-described relay selection method. Generally, suppose the system configurations are: $M_R=10$, $\sigma_R^2=\sigma_D^2=\sigma_E^2=1$, $P_S=P_R=1$. A scheme without relay selection is selected by comparison, i.e. any two relay nodes are selected to forward information and send interference. The indicator used for evaluation is the secrecy capacity.

Figure 5:
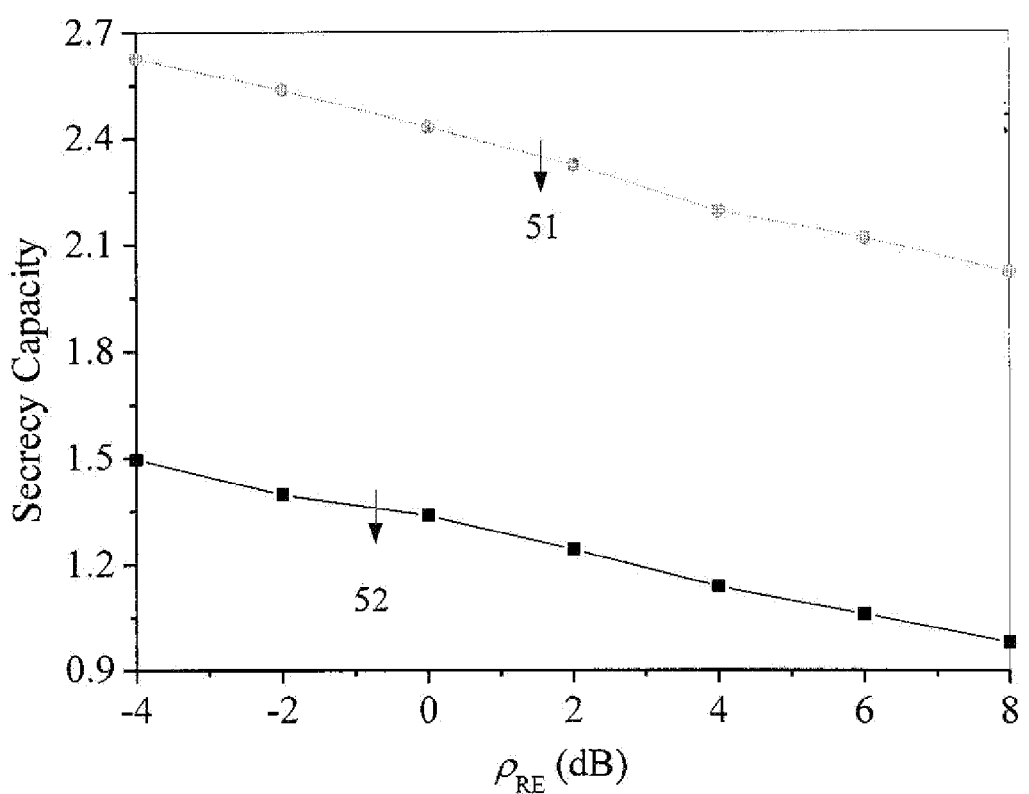
FIG. 5 is a schematic view of comparison between secrecy capacities of a relay selection method of the present invention and random relay selection.

Let $\rho_{SR}$, $\rho_{RD}$, $\rho_{RE}$ represent a mean value of $\gamma_{SR}$, $\gamma_{R,D}$, $\gamma_{R,E}$ respectively, and FIG. 5 shows the secrecy capacity where $\rho_{SR}=\rho_{RD}$ and $\rho_{RE}$ is changed. Graphical representation 51 is a curve of using the relay selection method of the present invention, and 52 is a curve of random relay selection. It can be seen that the secrecy capacity obtained by the relay selection method of the present invention is much greater than the random selection.

To sum up, compared with the prior art, when there exist multiple relay nodes between the source node and the destination node, existing efforts to combine physical layer information security and relaying mainly concentrate on a reproduction relay system: in the first phase, the source node broadcasts information to the multiple relay nodes, and the system selects the optimal node from successfully decoded relay nodes for forwarding and then selects an interfering node from other relay nodes for sending interference; in the second phase, the selected node is decoded and forwards information to the destination node after being recoded, and the interfering node sends interference information. The eavesdropping node can receive information sent from the relay node and the interfering node in the second phase. Nevertheless, the reproduction relay mode means high complexity to the system implementation from the perspective of a real system. The relay control method of the present invention is applicable to a non-reproduction relay system.

In addition, when there exists an eavesdropping node in the system, the source node cannot easily obtain channel information between itself and the eavesdropping node, whereas existing relay selection methods are all based on channel information between the source node and the eavesdropping node. In the relay control method proposed by the present invention, a selection approach not relying on channel information between the source node and the eavesdropping node is put forward initially; each relay node only needs to feed one real number to the source node, and the order of magnitudes of feedback information is controlled within $O(M_R)$ (where $M_R$ is the amount of relay nodes). Thus, the system's signaling feedback overheads are reduced significantly, which is simple and feasible in real systems.

What has been presented above is only preferred embodiments of the present invention. However, the protection scope of the present invention is not limited thereto. Changes or replacements that are readily contemplated by one skilled in the art within the technical scope of the present invention should fall within the protection scope of the present invention. Therefore, the protection scope of the present invention should be defined by the claims.

INDUSTRIAL APPLICABILITY

By means of the above construction, the method for controlling a relay transmission based on non-reproduction relay mode solves the issue of ensuring the system secrecy capacity in a relay transmission. Furthermore, the system structure is simple. While greatly reducing network signaling load and computation complexity, the system secrecy capacity is ensured, the performance-to-cost ratio is high, and stronger applicability is achieved.

The invention claimed is:

1. A method for controlling a relay transmission based on a non-reproduction relay mode, characterized by comprising:
each relay node within a service area to which a source node belongs obtaining source channel status information between each relay node and the source node and destination channel status information between each relay node and a destination node, calculating required channel information for relay selection and feeding the required channel information back to the source node;
after receiving channel information sent by the relay nodes, the source node, according to the channel information, selecting from the relay nodes a first group of relay nodes with greatest feedback values in the channel information to forward information and selecting a second group of relay nodes with second greatest feedback values to send interference information, selected relay nodes transmitting information to the destination node in cooperation with the source node in the non-reproduction relay mode.

2. The method according to claim 1, characterized in that, the step of each relay node obtaining source channel status information between each relay node and the source node and destination channel status information between each relay node and a destination node, calculating required channel information for relay selection and feeding the required channel information back to the source node comprises:
each relay node, after measuring channel coefficients between each relay node and the source node and between each relay node and the destination node, calculating absolute values of the channel coefficients between each relay node and the source node and between each relay node and the destination node, comparing the absolute values to obtain a smaller one and feeding the smaller value back to the source node.

3. The method according to claim 1, characterized by further comprising:
received information $y_{Ri}$ of the ith relay node selected to forward information being:

$$y_{R_i}=\sqrt{P_S}h_{SR_i}x_S+n_{R_i},$$

where information to be transmitted from the source node to the destination node is $x_S$, the ith relay node is selected to forward information, $h_{SR_i}$ is a channel between the source node and the ith relay node, $P_S$ is transmitting power of the source node, $n_{R_i}$ is a noise value of the ith relay node;
if a forward coefficient of the ith relay node is $\beta_i$, then forwarded information $x_{Ri}$ of the ith relay node is:

$$x_{R_i}=\beta_i y_{R_i}$$

where $\beta_i^{-2}=P_S|h_{SR_i}|^2+\sigma^2$, $\sigma^2$ noise power of the ith relay node;
the jth relay node selected to send interference information sends interference information, received information $y_D$ of the destination node is:

$$y_D=\sqrt{P_R}h_{R_iD}x_{R_i}+n_D,$$

where $n_D$ is a noise value of the destination node;
where received information $y_E$ of an eavesdropping node is:

$$y_E=\sqrt{P_R}h_{R_iE}x_{R_i}+\sqrt{P_R}h_{R_jE}x_{R_j}+n_E,$$

where information that is forwarded by the ith relay node to the destination node and the eavesdropping node is $x_{R_i}$, interference information that is sent by the jth relay node to the destination node and the eavesdropping node is $x_{R_j}$, $h_{R_iD}$ is a channel between the ith relay node and the destination node, $h_{R_iE}$ is a channel between the ith relay node and the eavesdropping node, and $P_R$ is transmitting power of the relay nodes within a service area to which the source node belongs.

4. The method according to claim 1, characterized by, further comprising:
   a step of determining relay nodes within the service area to which the source node belongs, wherein the source node determines the relay nodes within its service area by signaling.

5. The method according to claim 1, characterized by, further comprising:
   a relay node that is not selected among the relay nodes being kept on standby status, the relay node periodically updating the channel status information for next relay selection.

6. A device for controlling a relay transmission, characterized by comprising:
   an information obtaining unit for obtaining source channel status information between each relay node within a service area to which a source node belongs and the source node and destination channel status information between each relay node and a destination node;
   a calculating unit for calculating required channel information for relay selection according to the obtained channel status information; and
   a relay node selecting unit for, according to the calculated channel information, selecting from the relay nodes a first group of relay nodes with greatest feedback values in the channel information to forward information and selecting a second group of relay nodes with second greatest feedback values to send interference information.

7. The device according to claim 6, characterized in that, the information obtaining unit obtains source channel status information and destination channel status information by measuring channel coefficients between each relay node and the source node and between each node and the destination node, respectively;
   the calculating unit calculates the required channel information for relay selection by calculating absolute values of the channel coefficients between each relay node and the source node and between each relay node and the destination node and then comparing the absolute values to obtain a smaller one.

8. The device according to claim 6, characterized by, further comprising:
   a relay node determining unit for determining relay nodes within the service area to which the source node belongs.

9. The device according to claim 6, characterized in that, the relay node determining unit is further for using selected relay nodes to transmit information to the destination node in cooperation with the source node in the non-reproduction relay mode.

10. The device according to claim 9, characterized in that, received information $y_{Ri}$ of the ith relay node that is selected by the relay node selecting unit to forward information is:

$$y_{R_i} = \sqrt{P_S} h_{SR_i} x_S + n_{R_i},$$

where information to be transmitted from the source node to the destination node is $x_S$, the ith relay node is selected to forward information, $h_{SR_i}$ is a channel between the source node and the ith relay node, $P_S$ is transmitting power of the source node, $n_{Ri}$ is a noise value of the ith relay node;

if a forward coefficient of the ith relay node is $\beta_i$, then forwarded information $x_{Ri}$ of the ith relay node is:

$$x_{R_i} = \beta_i y_{R_i}$$

where $\beta_i^{-2} = P_S |h_{SR_i}|^2 + \sigma^2$, $\sigma^2$ is noise power of the ith relay node;

the jth relay node selected by the relay node selecting unit to send interference information sends interference information, received information $y_D$ of the destination node is:

$$y_D = \sqrt{P_R} h_{R_i D} x_{R_i} + n_D,$$

where $n_D$ is a noise value of the destination node;

where received information $y_E$ of an eavesdropping node is:

$$y_E = \sqrt{P_R} h_{R_i E} x_{R_i} + \sqrt{P_R} h_{R_j E} x_{R_j} + n_E,$$

where information that is forwarded by the ith relay node to the destination node and the eavesdropping node is $x_{Ri}$, interference information that is sent by the jth relay node to the destination node and the eavesdropping node is $x_{Rj}$, $h_{R_i D}$ is a channel between the ith relay node and the destination node, $h_{R_i E}$ is a channel between the ith relay node and the eavesdropping node, and $P_R$ is transmitting power of the relay nodes within a service area to which the source node belongs.

* * * * *